Figure 1:
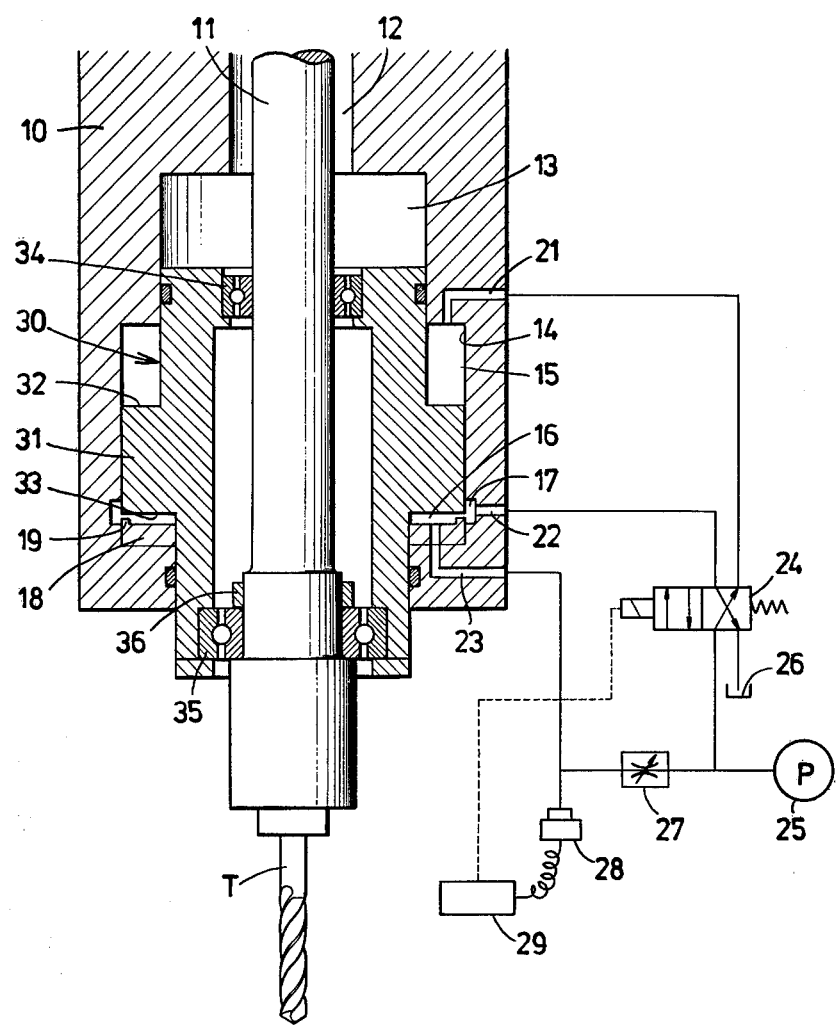

United States Patent [19]

Hida et al.

[11] 4,133,206

[45] Jan. 9, 1979

[54] THRUSTING FORCE DETECTING DEVICE OF A ROTARY MACHINING TOOL

[75] Inventors: Katsuaki Hida; Tadasu Matsushima; Yasuhiko Ishida; Yoshihira Nakano, all of Osaka, Japan

[73] Assignee: Shin Nippon Koki Co., Ltd., Osaka, Japan

[21] Appl. No.: 831,683

[22] Filed: Sep. 8, 1977

[30] Foreign Application Priority Data

Jun. 20, 1977 [JP] Japan ............................. 52-81260[U]

[51] Int. Cl.² .............................................. G01L 5/12
[52] U.S. Cl. ..................................... 73/133 R; 73/140
[58] Field of Search .................. 73/133 R, 140, 141 R; 408/6, 11

[56] References Cited

FOREIGN PATENT DOCUMENTS 4744664  9/1968  Japan ..................................... 73/141 R
694221   7/1953  United Kingdom ..................... 408/11

Primary Examiner—Charles A. Ruehl
Attorney, Agent, or Firm—Wenderoth, Lind & Ponack

[57] ABSTRACT

A thrusting force detecting device of a rotary machining tool includes a cylinder chamber formed within a ram for lowering and elevating a spindle of a cutting tool, a fluid chamber formed within the cylinder chamber and having a larger diameter than the cylinder chamber, a piston slidably and liquid-tightly fitted in the cylinder chamber and having a collar thereabout fitted in the fluid chamber, the collar dividing the fluid chamber into first and second chambers, the piston being rotatably mounted about the spindle in axially fixed relation thereto, means for supplying fluid pressure to the first and second chambers, and pressure sensitive means responsive to the pressure variation in the second chamber.

1 Claim, 2 Drawing Figures

THRUSTING FORCE DETECTING DEVICE OF A ROTARY MACHINING TOOL

The present invention relates to a thrusting force detecting device of a rotary machining tool.

Conventionally, it is widely employed to incorporate a safety clutch means in a holder for cutting tool such as drill and tap. The clutch means is adapted to permit the holder to race when the overload acted on the tool. However, as is known, this mechanical clutch means has a bad responsiveness to the variation of load, and further cannot be adjusted so as to meet the condition of operation, which varies depending on properties of workpiece, kinds of cutting tool and other factors. Therefore, it is necessary to prepare a number of holders incorporating different clutch means, if desired to machine a variety of workpieces.

Further, it is also known to incorporate an electrical thrusting force detecting device which include a pressure sensitive element such as diode, transistor or resistor. This is much more responsive to the variation of load, but meets only a narrow range of operation condition.

A primary object of the present invention is to obviate the above defects, and to provide a simple thrusting force detecting device which is accurately responsive to the variation of load and which meets a wide range of operation condition.

Figure 2:
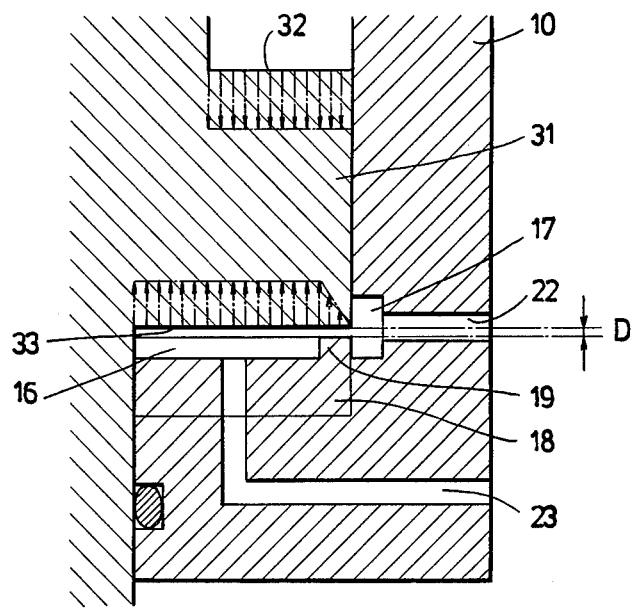

Other objects and features of the present invention will be apparent from the following description of the invention with reference to the accompanying drawings, in which:

FIG. 1 is a longitudinally sectioned view illustrating a rotary machining tool incorporating a thrusting force detecting device of the invention; and FIG. 2 is an enlarged sectional view showing the main part of the above.

Referring now to the drawings, in a ram 10 for lowering and elevating a main spindle 11 is provided a central bore 12 through which rotatably extends the spindle 11. To the end of the spindle 11 projecting out of the ram 10 is detachably connected a tool T such as drill.

A cylinder chamber 13 having a larger diameter than the bore 12 is formed in the end portion of the ram 10 so as to communicate with the bore 12. In the chamber 13 is formed a larger diameter portion 14. A piston 30 is slidably and liquid-tightly mounted within the chamber 13. A collar 31 formed about the piston 30 liquid-tightly fits in the larger diameter portion 14 and divides the portion 14 into a first chamber 15 and second chamber 16. An upper face 32 of the collar 31 defining the first chamber 15 has a smaller area than a lower face 33 thereof defining the second chamber 16. Preferably, the ratio of the areas 32 and 33 is about 1:1.2.

About the lower end of the chamber 13 is formed an annular recess 17. To the lower end of the chamber 13 is fitted a static pressure pad 18 which has substantially the same diameter as the collar 31 of the piston 30 and which has an annular ridge 19 at its outer edge.

With the first chamber 15 communicates a first port 21, with the second chamber 16 at the recess 19 a second port 22, and with the second chamber 16 at the middle portion of the pad 18 a third port 23. To the first and second ports 21, 22 is connected a solenoid switching valve 24 for switching fluid passages which extend from a fluid pressure supply pump 25 and to a fluid reservoir 26. The third port 23 is connected to the pump 25 through a throttle valve 27 which serves to prevent the primary side of the pump 25 (passage directly connected to the port 21) from following the pressure variation in the second chamber 16 and to generate a pressure drop.

Further, to the third port 23 is connected a pressure sensor 28 such as differential transformer or strain gauge, which converts the pressure variation in the second chamber 16 to electrical signals, and which is connected to an amplifier controller circuitry 29. The solenoid valve 24 is controlled by the amplifier controller 29.

In operation of the device of the present invention, the switching valve 24 normally positions at the right side as shown in FIG. 1. Therefore, a pressure medium such as oil is supplied from the pump 25 to the first chamber 15 through the port 21, and to the second chamber 16 through the throttle valve 27 and the third port 23. At the time, since the area of the uppper face 32 of the collar 31 is slightly smaller than that of the lower face 33, the piston 30 is slightly elevated to allow a slight gap D of about 0.01 to 0.02 mm between the annular ridge 19 of the pad 18 and the lower face 33 of the collar 31, thereby lowering the pressure in the second chamber 16, in which the pressures in the first and second chambers 15, 16 balance as indicated by the dot-dash arrows in FIG. 2 to hold the piston at the position. The pressure medium is exhausted from the second chamber 16 through the gap D, recess 17 and port 22 to the reservoir 26.

In this balancing condition, the ram 10 lowers, and the cutting operation by the tool T at the end of the spindle 11 starts. The thrusting force acts on the piston 30 through the spindle 11 and bearing 35, thereby slightly elevating the piston 30 against the internal pressure in the first chamber 15 to widen the gap D. As a result, the pressure in the second chamber 16 drops in proportion to the gap D. This variation of pressure is detected by the sensor 28, which supplies the amplifier controller 29 with electrical signals. When this variation shows abnormal value due to abrasion, breakage or the like of the tool T, the switching valve 24 is shifted to the left from the normal position shown in FIG. 1, whereby the port 21 of the first chamber 15 is connected to the reservoir 26, and the second port 22 of the second chamber 16 to the pump 25. As a result, the pressure in the first chamber 15 drops and the piston 30 is elevated together with the spindle 11 and tool T, thus interrupting the operation.

As described hereinbefore in detail, the thrusting force variation during cutting operation is transformed to the pressure variation in the fluid chamber responsive to the thrusting force, thus making it possible to control a machining tool according to the normal thrusting force which is determined by kinds of tool, workpiece and other factors.

Furthermore, the device of the present invention can be applied to a variety of tools since the fluid pressure is utilized for detecting the thrusting force and the normal value thereof can be preset in the controller so as to meet a wide range of operation condition.

What is claimed is:

1. A thrusting force detecting device for a rotary machining tool comprising a cylinder chamber formed within a ram for lowering and elevating a spindle of a cutting tool, a fluid chamber formed within the cylinder chamber and having a larger diameter than the cylinder chamber, a piston slidably and liquid-tightly fitted in the cylinder chamber and having a collar thereabout liquid-tightly fitted in the fluid chamber, the collar dividing the fluid chamber into first and second chambers, the piston being rotatably mounted about the spindle in axially fixed relation thereto, means for supplying fluid pressure to the first and second chambers, and pressure sensitive means responsive to the pressure variation in the second chamber.

* * * * *